(12) United States Patent
Auer et al.

(10) Patent No.: US 7,370,436 B2
(45) Date of Patent: May 13, 2008

(54) DUAL APPARATUS AND PROCESS FOR QUICK FREEZING AND/OR FREEZE DRYING PRODUCE

(76) Inventors: Ricardo Francisco Auer, Olleros 2953 (1426), Buenos Aires (AR); Julian Diego Roberts, Av. Quintana 62, 3 D (1014), Buenos Aires (AR); Michael Louis McGee, 777 NW. 72 Ave., Suite 3L2, Miami, FL (US) 33126; Mitsuru Masuda, 2-4-3 Myoden, Ichikawa (JP)

(*) Notice: Subject to any disclaimer, the term of this patent is extended or adjusted under 35 U.S.C. 154(b) by 511 days.

(21) Appl. No.: 10/483,454

(22) PCT Filed: Jul. 9, 2001

(86) PCT No.: PCT/US01/21907

§ 371 (c)(1),
(2), (4) Date: Jun. 29, 2004

(87) PCT Pub. No.: WO03/006904

PCT Pub. Date: Jan. 23, 2003

(65) Prior Publication Data

US 2004/0237328 A1    Dec. 2, 2004

(51) Int. Cl.
*F26B 5/04* (2006.01)
(52) U.S. Cl. .............. 34/403; 34/284; 34/287; 34/402
(58) Field of Classification Search .......... 34/79, 34/90, 92, 218, 287, 301, 284, 402, 403, 34/558, 559, 285, 289, 290, 296
See application file for complete search history.

(56) References Cited

U.S. PATENT DOCUMENTS

| | | | | |
|---|---|---|---|---|
| 626,579 A * | 6/1899 | Viele | ............................. | 34/92 |
| 3,574,951 A * | 4/1971 | Oetjen et al. | .................. | 34/92 |
| 3,820,250 A * | 6/1974 | Mishkin et al. | ............... | 34/287 |
| 4,612,200 A * | 9/1986 | Sato | ........................... | 426/242 |
| 5,138,520 A * | 8/1992 | McMillan et al. | ......... | 361/311 |

* cited by examiner

Primary Examiner—Patricia Bianco
Assistant Examiner—Camtu Nguyen
(74) Attorney, Agent, or Firm—Lucas & Mercanti, LLP

(57) ABSTRACT

An apparatus capable of performing consecutively, independently and/or simultaneously the processes of quick freezing and/or freeze drying of produce. The apparatus is characterized by a central vacuum system operating over one or more independent vacuum chambers (10,11,12,13,14); said vacuum system being composed of at least two vacuum subsystems (40,50), connected to the chambers by means of independent manifolds (400,500). One vacuum subsystem (40) evacuates air from any of the chambers from atmospheric pressure to a pressure slightly above that of the triple point of water, and the other vacuum subsystem (50) further quickly evacuates any of the chambers from said pressure slightly above the triple point of water to the pressure corresponding to the thermodynamic equilibrium of ice and water vapor at a desired freezing temperature, in a desired freezing time.

26 Claims, 4 Drawing Sheets

DUAL APPARATUS AND PROCESS FOR QUICK FREEZING AND/OR FREEZE DRYING PRODUCE

This patent application claims the benefit of priority from PCT International Application Serial No. PCT/US01/21907 filed Jul. 9, 2001, the contents of which is incorporated herein by reference.

BACKGROUND OF THE INVENTION

1. Field of the Invention

The invention relates to biological produce preservation by means of freezing and/or Freeze Drying said produces. More specifically, the invention relates to an apparatus able to perform consecutively, independently and, or simultaneously the processes of Individually Quick Freezing (IQF) and Freeze Drying (FD), and the methods to develop such processes.

Furthermore, the invention can be applied to other non biological Freeze Drying processes, such as pigments production, purification of minerals, and many others.

2. Description of the Related Art

A brief description of biologic produce preservation leads to consider the inhibition of the following processes, which have the main responsibility of their deterioration:

Microbial activity

Enzymatic activity

Chemical reactions

For those purposes, the main used methods are

Refrigerating: Lowering the temperature to a few degrees centigrade over zero diminishes all biologic and chemical processes. It is the less invasive method. Is useful to preserve produces for a short time (bacteria, lettuce, meat, etc.), and in some instances for medium storage time (vaccines, serum, apples, potatoes, etc.)

Freezing: The produce's temperature is lowered below their freezing point, which corresponds to some degrees centigrade below zero. (Depending on produces' sugar and/or salt content, their freezing point can be from a couple to fifteen or twenty centigrade below zero.) Freezing is the best way for medium and long storage time, providing freezing is performed at sufficient velocity to avoid cellular damage and a very low temperature is maintained permanently.

Freeze Drying: Is the second best way for medium and long storage time, provided good freezing and packaging be performed, and the best way to preserve produces at room temperature.

Drying: Natural drying may be the earliest preservation method in human history, good for cereals and some fruits. Accelerated methods have been developed comprising Spray Drying, Flake Drying, Fluidized Bed Drying, etc.

Thermal treating: Mainly Pasteurization and Sterilization, very used for milk, pouched or canned food, etc.

Water activity reduction: Achieved by the addition of important quantities of sugar (for sweets, marmalades, etc.) or salt.

Radiation: Sterilization is produced by the exposition to radioactivity, mainly gamma rays.

From all the above mentioned methods, the first three will be more detailed for their relation with the present invention.

2.1. Refrigeration

A first classification can be made between methods where indirect or direct contact between the refrigerating fluid and the produce is made.

The first instance is the most frequent, where the typical refrigeration cycle comprises three subsystems: an evaporator (normally a coil where a liquid is expanded and evaporated while absorbing its latent heat); a compressor, where the vapor is compressed and its temperature is raised by means of the compression; and a condenser, (normally another coil where the vapor looses its latent heat and condenses to liquid which goes again to the evaporator).

Different substances as Ammonia, Freon or Hydrocarbons are used as refrigerating fluids, depending on the desired refrigerating temperatures. An intermediary fluid, generally air, is cooled by means of contact with the evaporator coil, and it moves by natural or forced convection through the produces to be cooled.

In the direct contact method, the refrigerating fluid (In many cases water) is cooled and irrigated over the produce. This method, known as Hydro cooling, is very used immediately after harvesting lettuce or other vegetables. The water is cooled by means of its own evaporation, without need of a refrigerating cycle as in the indirect contact method.

Another alternative of the direct contact method consists in irrigating the produces with water at room temperature and cooling the water and the produces at the same time by means of water evaporation produced by vacuum inside the refrigeration chamber.

A very accurate way to control the temperature of water and of the irrigated produces is to control the pressure, as there is an exact relation between it and the equilibrium temperature of the liquid-vapor system. This method is known as Vacuum Cooling and constitutes one of the most significant antecedents to the present invention. U.S. Pat. Nos. 5,992,169 and 5,386,703 refers to apparatus and methods for cooling vegetables by means of water chilled by vacuum, and/or by means of evaporation of water added to the produce.

U.S. Pat. Nos. 5,375,431; 5,386,703; 4,576,014; 3,844,132 amongst others, describe apparatus comprising a vacuum chamber for receiving produce, a vacuum pump, a refrigeration system for collecting evaporated water and a pump to spray the water onto the produce. The vacuum pump reduces the pressure within the chamber to sub atmospheric level, causing evaporation of moisture from the produce. This evaporation removes heat from the produce, reducing its temperature. Water vapor formed by such evaporation condenses on cooling coils positioned above the produce. These refrigerated coils preferably condense and collect as much water as is feasible to prevent the water from reaching the vacuum pump. This water is collected and directed to a reservoir below the produce. The collected water, in preferred embodiments, is at a temperature in the range of about 1 to 4 degrees Centigrade.

Additionally, a water recirculating system can utilize water from the reservoir at the bottom of the vacuum chamber, and spray it over the produce, for further cooling effect, this reservoir water may be passed through a filtration device utilizing non residual free radical chemical methods of filtration or ultraviolet light to reduce the micro biotic load and insure freshness.

All these systems are limited to final temperatures over zero ° C.

2.2. Freezing

In a biologic produce, water is present in many forms; it can be free on the surface; adsorbed in it; as a solvent in the intercellular space; as a solvent inside the cells; combined with other substances; constituting sugar crystals; etc.

All those different ways in which water is found have different freezing points, so that full freezing is reached when all those solutions are frozen. But in industrial practice a substance is considered frozen when most forms of water are frozen, even if a small quantity of water remains in liquid state.

In food industry produces are frequently considered frozen at −18° C., even when for lamb meat at this temperature only 88% of the water is frozen, 91% for fish and 93% for egg albumin.

A very important phenomenon in freezing biological produces is constituted by the size of the ice crystals because, if the size is comparable to cellular size, breakage of cells occurs, the produce structure is damaged, intracellular fluids are lost when the produce defrosts, denaturalization of proteins can be produced, etc.

Ice crystal size is controlled by the freezing velocity, ranging from a very small size when freezing occurs in ten to twenty seconds, up to a millimeter or more if freezing time is of around one hour or more.

As in most freezing methods heat has to be extracted from the produce, the freezing time increases with the produce's density and mass, and the shape factor volume/surface, and decreases with produce's thermal conductivity.

In consequence, higher velocities are achieved when small size produces are individually frozen, and an industrial standard has been developed, identified with the acronym IQF (for Individually Quick Freezing, or Individually Quick Frozen).

IQF is referred to as a freezing process occurring In a short time (In the range of around one half of a minute) and to the produces therein obtained. In this short freezing time, ice crystals have no time to grow, and a great quantity of small size crystals are obtained, homogeneously distributed in the inter and intra cellular space.

In this condition crystals size is very small (they are not visible to the optical microscope), and no rupture of the cells is produced. For the same reason, there is no time for water to migrate from the intra to the intercellular space, so no increase in salt concentration inside the cells is produced, and no denaturalization of cellular proteins occurs.

To achieve such freezing velocity, cryogenic methods are used, where the produce, in small pieces passes trough a rain of liquid nitrogen or liquid carbonic anhydride, where it is quickly frozen.

Even with the inconvenient of the high energetic cost of this process (around 1.5 Kg of liquid nitrogen is needed to freeze 1 Kg of vegetables, and after being frozen, the produces have to be stored at around −20° C.), the quality of the produces is so good (it is the best way to preserve biologic produces) that IQF usage is growing all over the world. The following table shows typical freezing times of different methods used for some foods:

| Freezing method | Freezing time [minutes] | Food |
|---|---|---|
| Air (natural convection) | 180–4,000 | |
| Plates | 25–75 | Fish, vegetables |
| Air (forced convection) | 15–20 | Beans, (bulk) |
| Spiral tunnel | 12–19 | Hamburger, fish |
| Fluidized bed | 3–15 | Beans, (individual) |
| Scratch surface | 0.3–0.5 | Ice cream |
| Cryogenic (Liquid Nitrogen) | 0.2–5 | Hamburger, Sea food, (IQF) |

U.S. Pat. Nos. 5,079,932 4,928,495; 4,901,535; 4,759,191; 4,736,599 and 4,250,720 describe method and or apparatus to freeze produces by means of vacuum applied, but these patents do not take into account the size of ice crystals or the freezing velocity.

2.3. FD

Freeze Drying is the second best way to preserve biologic produces, and the best way to do it without the need to store the produces at low temperature. In this process, the produces are first frozen and after they are dried, in most cases by means of vacuum below 2 Torr applied to them, thus making water contained in the produce to sublimate.

When most of the water is eliminated, the produces' temperature is raised, and the residual humidity is lost. The resulting produce structure is a sponge, formed by the solid part of its cells and fibers. As the water concentration is very low, no microbial activity is possible and, if oxidation is avoided by means of storing the produce in an inert atmosphere, it can be preserved many years at room temperature, without biochemical changes.

When the produce has to be used, it can be easily rehydrated, by the sole addition of water, and the original properties are recuperated. (Ferments, bacteria, antibiotics, blood plasma, food and beverages are preserved by this way).

Freeze Drying has no need of a low storage temperature, but since it adds the cost of water sublimation to the IQF costs, its usage has up to now been restricted to high valued produces, i.e. pharmaceuticals, astronauts food or specialties whose value can support its process costs.

Several vacuum systems have been used in conventional equipment, most of them consisting in a desublimator where water vapor is retained in a cooled wall and mechanical pump systems such as Root pumps and/or rotary or piston pumps.

Many apparatus and processes referred in U.S. Pat. Nos. 5,596,814; 5,269,077; 5,230,162; 5,131,168; 4,590,684; 4,035,924; 3,740,860 and 3,077,036 amongst others, have been developed to reduce FD costs, and its application has expanded to medium prize food as soluble coffee or tea, shrimps, some vegetables, soups, sauces, etc.

Freeze Drying technology can be classified in batch or continuous processes:

In batch processes, (see FIG. 1) the produces are frozen (Segment AB, FIG. 2) and placed in a drying chamber, where vacuum of around 1 Torr is applied (Segment BCD, FIG. 2). Heat is then transferred to the produce and sublimation of water occurs. As water is being eliminated, Freeze Drying velocity drops (FIG. 3) and produce's temperature raises slowly (Segment CD FIG. 2). When 0° C. is reached, Freeze Drying phase is finished, but in most cases there remains too much water to guarantee a long storage time at room temperature, so a desorption phase must take place, where water is eliminated up to a 3-10% residual content (Segment DE, FIG. 2).

In the continuous process, the produce passes through a series of chambers isolated one from the other by means of vacuum barriers, wherein the different stages of curve ABCDE of FIG. 2 take place.

SUMMARY OF THE INVENTION

The invention solves the problems related to the high process cost of Quick Freezing and/or Freeze Drying, the two best methods to preserve biologic produces, in a single dual equipment.

Said dual equipment is able to perform consecutively, independently or simultaneously the processes of Quick Freezing and/or Freeze Drying of produces, with a very inferior cost to that of the existing technologies.

The apparatus is characterized by a central vacuum system operating on two or more independent vacuum chambers, and said vacuum system is composed of at least two vacuum subsystems:

One is designed to evacuate air from the vacuum chambers, from the atmospheric pressure down to a pressure slightly superior to that of the triple point of water.

The second vacuum subsystem is designed to quickly evacuate water vapor from each vacuum chamber from a slightly superior water triple point pressure to the pressure corresponding to the thermodynamic equilibrium of ice and water vapor at the desired freezing temperature.

All vacuum subsystems can operate consecutively, independently or simultaneously on each chamber, depending on the kind and stage of the process being performed. Chambers are interconnected by means of manifolds and can be isolated by means of valves.

The objects of the present invention are:

a) To provide a system (equipment and processes) to produce high quality Quick Frozen produces, equivalent to those obtained by cryogenic methods, but with extremely lower costs. This is achieved by taking advantage of the self-freezing that occurs when liquid water is exposed to a pressure below that of its triple point.

b) To Quick Freeze not only individually but also in bulk. It is important to point out that all systems or equipment used up to today can only Quick Freeze Individually, but not in bulk.

c) To provide a system to perform Quick Freezing processes for pre-packaged produces, even inside thermal insulating packaging. This is possible because it is not necessary to transfer heat from the produce to the exterior, because the produces are self-frozen by water evaporation and sublimation.

d) To significantly reduce the cost of the Freeze Drying process by taking advantage of the sequential operation of different chambers. The above mentioned cost reduction can be explained because Freeze Drying velocity, defined as the amount of water being sublimated per unit of time, drops very sharply as the process progresses (see FIG. 3). Up to now, in the batch process, the vacuum system, which needs to be able to evacuate at maximum velocity, works most of the time of the process below its optimum rating.

The equipment corresponding to the present invention permits a low cost, semi-continuous Freeze Drying operation, including the preliminary Quick Freezing of the produces to be freeze dried, in the same chamber, without requirement of cryogenic fluids or refrigeration systems of any kind other than the vacuum self-freezing.

Figure 1:
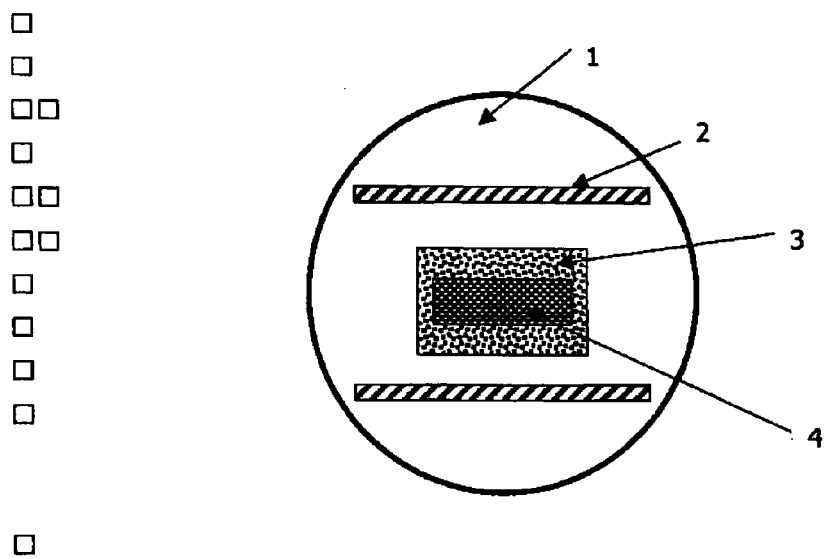
FIG. 1: A vacuum chamber (1) has heating plates (2). Between them, the frozen produce to be freeze dried is located. As Freeze Drying process takes place, the external portion of the produce (3) looses its water by sublimation, and its structure becomes sponge-like. The produce's nucleus (4) remains frozen. As Freeze Drying process progresses, its interfase with the dried portion moves towards the center until sublimation is finished.
Figure 2:
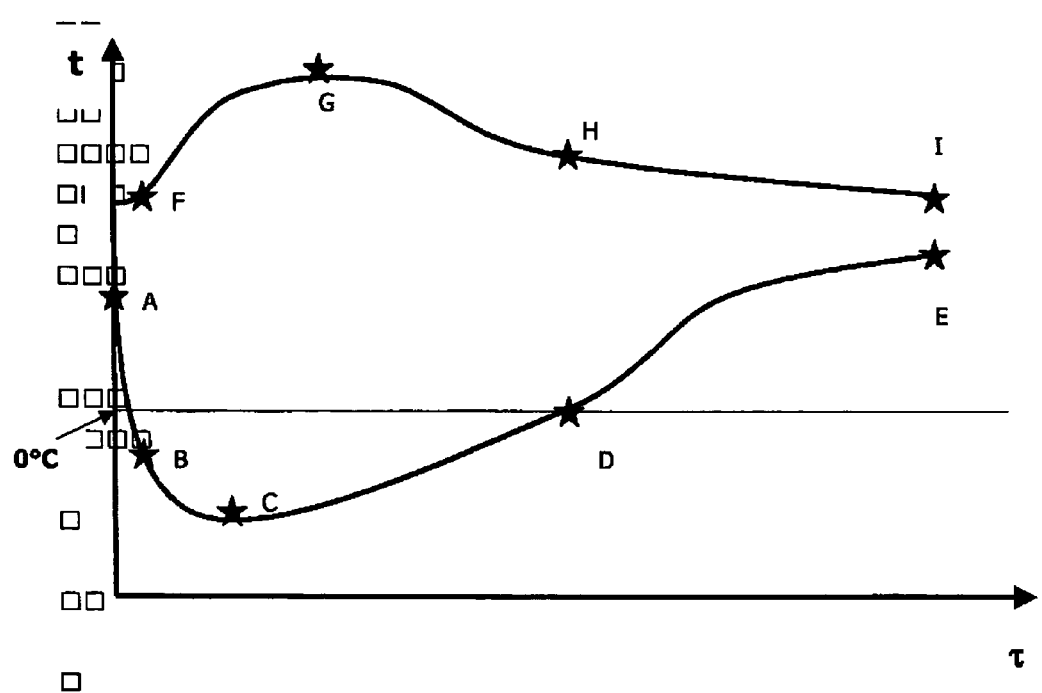
FIG. 2: The figure represents Temperature t vs. Time $\tau$ of the batch Freeze Drying process of FIG. 1. The produce is frozen from initial temperature A up to B. Afterwards, the produce is located inside the chamber, between the heating plates. When vacuum is applied, the temperature of the produce descends even more, up to point C.

The frozen nucleus of FIG. 1 keeps on reducing towards the center as the Freeze Drying process advances, and because the heat coming from the plates has to cross the freeze dried layer to arrive to the frozen interfase of the nucleus, the Freeze Drying velocity drops. When point D is reached there is no more ice and the Freeze Drying process is theoretically finished. Nevertheless, there is still too much water to assure a long-term storage at room temperature and a desorption process (Segment DE) has to be developed until the produce finishes with a 3-10% of residual humidity.

When vacuum starts to be applied, the plates' temperature is raised from point F to point G. In order to avoid damage of the produce's surface by overheating while the frozen nucleus reduces and the dried layer grows, the plates' temperature must be diminished up to point H. Finally, during the desorption stage, the plates' temperature has to be reduced even more, up to point I, where the process is finished.

Figure 3:
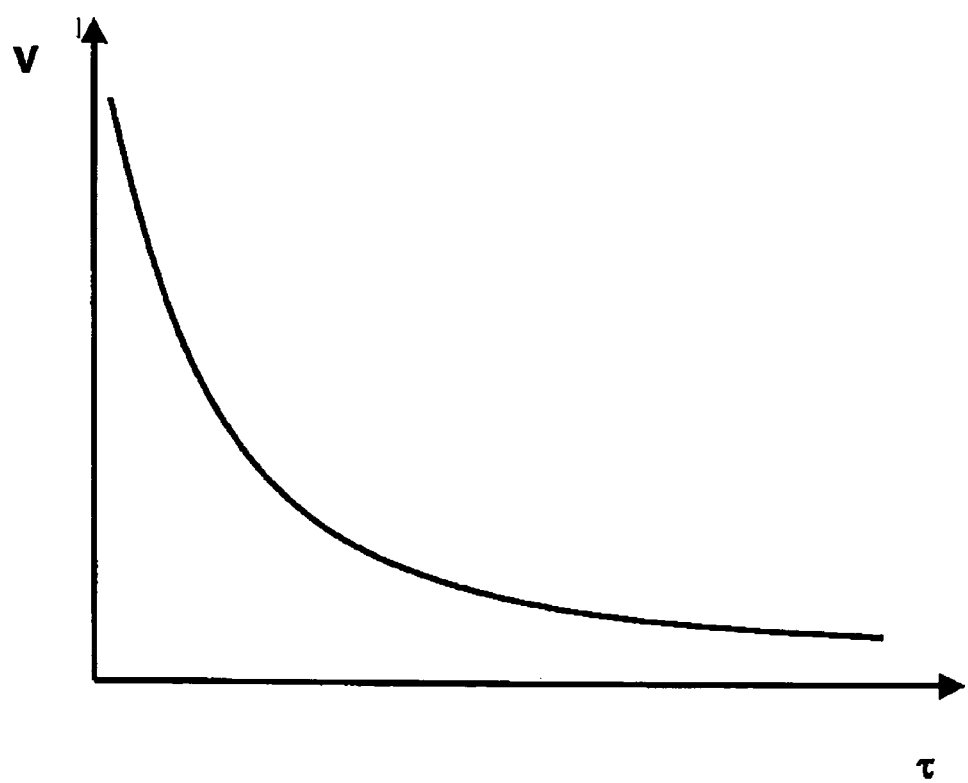

FIG. 3: The figure is the representation in axis Freeze Drying velocity V vs. Time $\tau$ of the batch Freeze Drying process of FIG. 1. Freeze Drying velocity drops sharply as process advances, due to the increasing resistance to heat transfer from heating plates to the frozen interface, crossing a growing freeze dried thickness, sponge-like structure, which has low thermal conductivity.

Figure 4:
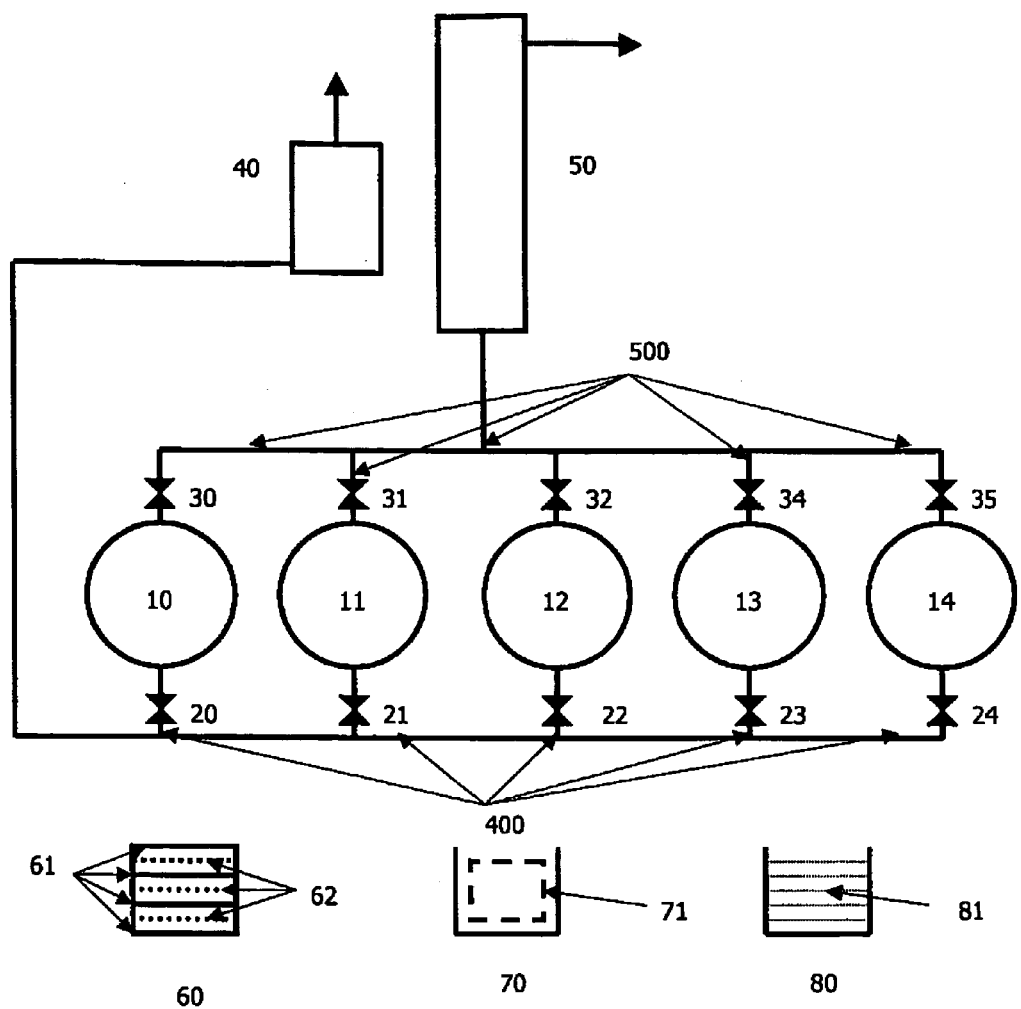

FIG. 4: FIG. 4 corresponds to a preferred embodiment of the invention. Vacuum chambers 10, 11, 12, 13, 14 are connected by means of a manifold 400 through valves 20, 21, 22, 23, 24 to vacuum sub system 40, mainly designed to evacuate air from atmospheric pressure down to 5 Torr. Other vacuum subsystems, 50, is designed to quickly evacuate water vapor from 5 Torr down to 0.5 Torr and to sustain water vapor at a pressure of 0.5 Torr in permanent operation. This vacuum subsystems 50 is connected to the chambers by means of manifold 500 through the set of valves 30, 31, 32, 33, 34.

Three sets of carts 60, 70 and 80 are used. Set 60 is used for Quick Freezing and consecutively Freeze Drying, having heating plates 61 and shelves 62 to allocate the produce between the plates. Set 70 is used only for bulk Quick Freezing of produces, allocated in boxes 71 inside it. Set 80 is used to perform Individually Quick Freezing, having shelves 81 to place the produce on them.

DETAILED DESCRIPTION OF THE INVENTION, AND PREFERRED EMBODIMENTS THEREOF

1. Quick Freezing

The kinetic-molecular theory, considers that molecules in vapor and liquid phases have different average velocities, and in any instance the fastest molecules of liquid are evaporating and the slowest molecules of the vapor are condensing, being both velocities equal at equilibrium.

Under these conditions, the theory shows how temperature descends when a liquid is evaporated under adiabatic conditions by means of reducing the partial pressure of its vapor. The same occurs at solid-vapor equilibrium: the temperature descends when vapor pressure is reduced under adiabatic conditions.

There is only one condition of pressure and temperature where the three phases can coexist: the triple point. If the substance is water, the triple point is obtained at 4.581 Torr and 0° C. Liquid water does not exist below 4.581 Torr.

Consequently, if a system constituted by water in liquid and vapor state in equilibrium at a certain temperature is evacuated under adiabatic conditions, the temperature descends, being always a relation between the vapor pressure and the systems' temperature.

If evacuation continues, when the vapor pressure reaches the value of 4.851 Torr, the systems' temperature reaches 0° C. Furthermore, the liquid water begins to solidify, and the temperature and vapor pressure remain constant until all water is transformed into ice. From this moment, the systems' temperature and vapor pressure continue to descend.

In any case the relation between vapor pressure and temperature is the same. This relation is known as the equilibrium pressure-temperature curve. The following table shows some of its values:

c) the descend of one degree Centigrade of one gram of liquid water gives one calorie, d) the descend of one degree Centigrade of one gram of solid water gives around 0.48 calorie.

So, to produce the cooling and freezing of 100 grams of water from 1° C. to −10° C. it will be necessary to eliminate the following enthalpy from them:

| | |
|---|---:|
| Descend from 1° C. down to 0° C. | 100 calories |
| Freezing | 8000 calories |
| Descend from 0° C. down to −10° C. | 480 calories |
| Total | 8,580 calories |

To eliminate the above mentioned 8.580 calories it will be necessary to evaporate=14.37 g of water (8.580/597).

It Is sufficient to evaporate a relatively small quantity of water (14.37%) to cool and freeze the rest of water down to −10° C. To avoid the loss of water during the process, this amount of water can be added before.

Now, the problem to quickly transfer heat has been transformed in that of quickly evacuate the necessary amount of water to produce cooling and freezing.

| | p [Torr] | | | | | | | | |
|---|---|---|---|---|---|---|---|---|---|
| | 0.096 | 0.284 | 0.773 | 1.947 | 3.009 | 3.278 | 4.214 | 4.581 | 4.926 | 5.293 |
| t [° C.] | −40 | −30 | −20 | −10 | −5 | −2 | −1 | 0 | 1 | 2 |

The system evolves always to reach its equilibrium with high velocity. If, as an example, the vapor pressure is 5.293 Torr, the temperature will be 2° C. and, if the pressure is reduced to 4.926 Torr, the temperature will immediately descend to 1° C. If the pressure is now reduced to 1.947 Torr the system will develop the following transformations: temperature will descend to 0° C., liquid water will solidify at 0° C. and then the temperature will descend to −10° C., which is the equilibrium temperature for 1.947 Torr.

The evolution of the system through its equilibrium is very fast. If the pressure is reduced to its final value in a certain time, the temperature will follow this descent as close as possible, achieving equilibrium at the same time or in a very slightly superior period of time.

The practical consequence of this phenomenon is that it is possible to reduce the temperature and/or freeze produces by means of reducing the vapor pressure over it.

In many cases, when vacuum is applied to a system, the pressure inside is rapidly homogenized and consequently in a very short period of time, temperatures in all the parts of the system will be the same, avoiding under or overcooling.

In most cases it is possible to quick freeze a produce, in a shorter time by lowering the pressure than by eliminating heat from it. A method to quick freeze a produce is by lowering the pressure quickly, for which a high capacity to evacuate vapor is needed.

Considering the enthalpy changes (quantities of heat to be transferred) of the involved phenomena we can see that:

a) the evaporation of one gram of liquid water requires around 597 calories, b) the freezing of one gram of water gives around 80 calories, The first advantage is that, with the exception of produces having shell or peel (eggs, fruits, etc.), the resistance to water vapor diffusion is less than the resistance to heat diffusion. Even in the case of peels, the high resistance to vapor diffusion through them can be solved by means of the production of discontinuities (cuts, pinholes, etc.).

In such way, the thickness of the produce generates fewer problems to be quick frozen than in conventional methods, being possible to reach freezing velocities as high as in cryogenic methods, even in the case of thick parts or bulk produces.

The second advantage is that produce can be frozen pre-packaged, even inside thermal insulating packaging, provided vapor extraction is allowed.

The third advantage is that the cost to quickly evacuate the necessary amount of water in the range of around 5 Torr to 1 Torr (corresponding to temperatures from 2° C. to −18° C.) is much cheaper than that of the cryogenic method.

2. Freeze Drying

As it was said before, Freeze Drying velocity drops very sharply as the process progresses (see FIG. 3). As shown in FIG. 1, Freeze Drying progresses from the outer part of the produce towards the center. The frozen nucleus reduces until it disappears at the end of the sublimation phase. The sponge structure of the freeze dried layer has a high resistance to heat transfer and, as said layer increases, the amount of heat transferred to the frozen core per unit of time decreases causing the reduction of freeze drying velocity. The vacuum system works below its optimum rating during most of the time because its capacity is only fully utilized at the beginning of the process.

But if several chambers could be connected to a central vacuum system, and means to be operated sequentially were available, it would be possible to compensate the high initial Freeze Drying velocity occurring in some chambers with the low final velocity in the others.

This is shown in the following examples:

EXAMPLE 1

The following example refers the Freeze Drying of 15 Kg of French fries having 50% of initial water content, allocated in a vacuum chamber, over a shelf of one square meter of exposed area (that means a surface density of 15 Kg/m$^2$). The heating plates had a constant temperature of 100° C., and the system was evacuated up to a pressure of 1 Torr.

The total produce mass was measured during a process time of 8 hours, and the Freeze Drying velocity was calculated as the sublimated mass by unit of time (dm/dt), with the following results:

| time h | dm/dt Kg/h | Relative Humidity |
|---|---|---|
| 0 | 2.808 | 50.0% |
| 1 | 1.931 | 40.7% |
| 2 | 1.328 | 32.1% |
| 3 | 0.913 | 24.5% |
| 4 | 0.628 | 18.3% |
| 5 | 0.432 | 13.3% |
| 6 | 0.297 | 9.6% |
| 7 | 0.204 | 6.8% |
| 8 | 0.140 | 4.8% |

It can be seen that the produce lost 31% of its residual water during each hour. The sublimation velocity decreased from 2.08 Kg/h for t=0 up to 0.14 Kg/h for t=8, when the residual water content was of 4.8% and, from the practical point of view, the process was finished.

Approximately 77.6% of water content was eliminated during the first four hours of the process, and other four hours were required to loose another 17.4%. The mean velocity for the process was 0.9 Kg/h, and the velocity for the last hour of the process was 0.14 Kg/h, only 6.7% of the initial Freeze Drying velocity.

Obviously, as the process progresses, the sublimation capacity of the equipment is increasingly misused.

EXAMPLE 2

The following example refers the Freeze Drying of 15 Kg of French fries having 50% of initial water content, allocated in two vacuum chambers, over a shelf of one half square meter of exposed area in each one (that means a surface density of 15 Kg/m$^2$). The process is initiated in one chamber, and after four hours in the other. The heating plates had a constant temperature of 100° C., and each chamber was evacuated up to a pressure of 1 Torr.

The total produce mass was measured during a process time of 8 hours, after the initial four hours lag, and the Freeze Drying velocity was calculated as the sublimated mass by unit of time in each chamber and in total (dm/dt), with the following results:

| time | dm1/dt | dm2/dt | dm/dt |
|---|---|---|---|
| 0 | 1.404 | 0.000 | 1.404 |
| 1 | 0.966 | 0.000 | 0.966 |
| 2 | 0.664 | 0.000 | 0.664 |
| 3 | 0.457 | 0.000 | 0.457 |
| 4 | 0.314 | 1.404 | 1.718 |
| 5 | 0.216 | 0.966 | 1.182 |
| 6 | 0.148 | 0.664 | 0.813 |
| 7 | 0.102 | 0.457 | 0.559 |
| 8 | 0.070 | 0.314 | 0.384 |
| 9 | 1.404 | 0.216 | 1.620 |
| 10 | 0.966 | 0.148 | 1.114 |
| 11 | 0.664 | 0.102 | 0.766 |
| 12 | 0.457 | 0.070 | 0.527 |
| 13 | 0.314 | 1.404 | 1.718 |
| 14 | 0.216 | 0.966 | 1.182 |
| 15 | 0.148 | 0.664 | 0.813 |
| 16 | 0.102 | 0.457 | 0.559 |
| 17 | 0.070 | 0.314 | 0.384 |

It can be seen that, after the initial lag, the maximum velocity was of 1.718 Kg/h and the minimum velocity was of 0.384 Kg/h. The mean velocity for the process was 0.9 Kg/h, and the minimum velocity was 22.36% of the maximum velocity.

EXAMPLE 3

The following example refers the Freeze Drying of 15 Kg of French fries having 50% of initial water content, allocated in nine vacuum chambers, over respective shelves of one ninth square meter of exposed area in each one (that means a surface density of 15 Kg/m$^2$). The process was initiated in one chamber, and from this moment, each hour a new chamber initiates the process. The heating plates had a constant temperature of 100° C., and each chamber was evacuated up to a pressure of 1 Torr. After eight hours, the process was finished in the first chamber, its produce is discharged; the chamber is charged with new produce and the process was reinitiated.

The total produce mass was measured during a process time of 8 hours, after the initial eight hours lag, and the Freeze Drying velocity was calculated as the sublimated mass by unit of time in each chamber and in total (dm/dt), with the following results:

| t | dm1/dt | dm2/dt | dm3/dt | dm4/dt | dm5/dt | dm6/dt | dm7/dt | dm8/dt | dm9/dt | dm/dt |
|---|---|---|---|---|---|---|---|---|---|---|
| 0 | 0.312 | | | | | | | | | 0.312 |
| 0.5 | 0.259 | | | | | | | | | 0.259 |
| 1 | 0.215 | 0.312 | | | | | | | | 0.527 |
| 1.5 | 0.178 | 0.259 | | | | | | | | 0.437 |
| 2 | 0.148 | 0.215 | 0.312 | | | | | | | 0.674 |

-continued

| t | dm1/dt | dm2/dt | dm3/dt | dm4/dt | dm5/dt | dm6/dt | dm7/dt | dm8/dt | dm9/dt | dm/dt |
|---|---|---|---|---|---|---|---|---|---|---|
| 2.5 | 0.122 | 0.178 | 0.259 | | | | | | | 0.559 |
| 3 | 0.101 | 0.148 | 0.215 | 0.312 | | | | | | 0.776 |
| 3.5 | 0.084 | 0.122 | 0.178 | 0.259 | | | | | | 0.643 |
| 4 | 0.070 | 0.101 | 0.148 | 0.215 | 0.312 | | | | | 0.845 |
| 4.5 | 0.058 | 0.084 | 0.122 | 0.178 | 0.259 | | | | | 0.701 |
| 5 | 0.048 | 0.070 | 0.101 | 0.148 | 0.215 | 0.312 | | | | 0.893 |
| 5.5 | 0.040 | 0.058 | 0.084 | 0.122 | 0.178 | 0.259 | | | | 0.741 |
| 6 | 0.033 | 0.048 | 0.070 | 0.101 | 0.148 | 0.215 | 0.312 | | | 0.926 |
| 6.5 | 0.027 | 0.040 | 0.058 | 0.084 | 0.122 | 0.178 | 0.259 | | | 0.768 |
| 7 | 0.023 | 0.033 | 0.048 | 0.070 | 0.101 | 0.148 | 0.215 | 0.312 | | 0.949 |
| 7.5 | 0.019 | 0.027 | 0.040 | 0.058 | 0.084 | 0.122 | 0.178 | 0.259 | | 0.787 |
| 8 | 0.016 | 0.023 | 0.033 | 0.048 | 0.070 | 0.101 | 0.148 | 0.215 | 0.312 | 0.965 |
| 8.5 | 0.312 | 0.019 | 0.027 | 0.040 | 0.058 | 0.084 | 0.122 | 0.178 | 0.259 | 1.099 |
| 9 | 0.259 | 0.016 | 0.023 | 0.033 | 0.048 | 0.070 | 0.101 | 0.148 | 0.215 | 0.911 |
| 9.5 | 0.215 | 0.312 | 0.019 | 0.027 | 0.040 | 0.058 | 0.084 | 0.122 | 0.178 | 1.055 |
| 10 | 0.178 | 0.259 | 0.016 | 0.023 | 0.033 | 0.048 | 0.070 | 0.101 | 0.148 | 0.875 |
| 10.5 | 0.148 | 0.215 | 0.312 | 0.019 | 0.027 | 0.040 | 0.058 | 0.084 | 0.122 | 1.025 |
| 11 | 0.122 | 0.178 | 0.259 | 0.016 | 0.023 | 0.033 | 0.048 | 0.070 | 0.101 | 0.850 |
| 11.5 | 0.101 | 0.148 | 0.215 | 0.312 | 0.019 | 0.027 | 0.040 | 0.058 | 0.084 | 1.004 |
| 12 | 0.084 | 0.122 | 0.178 | 0.259 | 0.016 | 0.023 | 0.033 | 0.048 | 0.070 | 0.832 |
| 12.5 | 0.070 | 0.101 | 0.148 | 0.215 | 0.312 | 0.019 | 0.027 | 0.040 | 0.058 | 0.989 |
| 13 | 0.058 | 0.084 | 0.122 | 0.178 | 0.259 | 0.016 | 0.023 | 0.033 | 0.048 | 0.820 |
| 13.5 | 0.048 | 0.070 | 0.101 | 0.148 | 0.215 | 0.312 | 0.019 | 0.027 | 0.040 | 0.979 |
| 14 | 0.040 | 0.058 | 0.084 | 0.122 | 0.178 | 0.259 | 0.016 | 0.023 | 0.033 | 0.812 |
| 14.5 | 0.033 | 0.048 | 0.070 | 0.101 | 0.148 | 0.215 | 0.312 | 0.019 | 0.027 | 0.973 |
| 15 | 0.027 | 0.040 | 0.058 | 0.084 | 0.122 | 0.178 | 0.259 | 0.016 | 0.023 | 0.607 |
| 15.5 | 0.023 | 0.033 | 0.048 | 0.070 | 0.101 | 0.148 | 0.215 | 0.312 | 0.019 | 0.968 |
| 16 | 0.019 | 0.027 | 0.040 | 0.058 | 0.084 | 0.122 | 0.178 | 0.259 | 0.016 | 0.803 |
| 16.5 | 0.016 | 0.023 | 0.033 | 0.048 | 0.070 | 0.101 | 0.148 | 0.215 | 0.312 | 0.965 |
| 17 | 0.312 | 0.019 | 0.027 | 0.040 | 0.058 | 0.084 | 0.122 | 0.178 | 0.259 | 1.099 |
| 17.5 | 0.259 | 0.016 | 0.023 | 0.033 | 0.048 | 0.070 | 0.101 | 0.148 | 0.215 | 0.911 |
| 18 | 0.215 | 0.312 | 0.019 | 0.027 | 0.040 | 0.058 | 0.084 | 0.122 | 0.178 | 1.055 |
| 18.5 | 0.178 | 0.259 | 0.016 | 0.023 | 0.033 | 0.048 | 0.070 | 0.101 | 0.148 | 0.875 |
| 19 | 0.148 | 0.215 | 0.312 | 0.019 | 0.027 | 0.040 | 0.058 | 0.084 | 0.122 | 1.025 |
| 19.5 | 0.122 | 0.178 | 0.259 | 0.016 | 0.023 | 0.033 | 0.048 | 0.070 | 0.101 | 0.850 |
| 20 | 0.101 | 0.148 | 0.215 | 0.312 | 0.019 | 0.027 | 0.040 | 0.058 | 0.084 | 1.004 |
| 20.5 | 0.084 | 0.122 | 0.178 | 0.259 | 0.016 | 0.023 | 0.033 | 0.048 | 0.070 | 0.832 |
| 21 | 0.070 | 0.101 | 0.148 | 0.215 | 0.312 | 0.019 | 0.027 | 0.040 | 0.058 | 0.989 |
| 21.5 | 0.058 | 0.084 | 0.122 | 0.178 | 0.259 | 0.016 | 0.023 | 0.033 | 0.048 | 0.820 |
| 22 | 0.048 | 0.070 | 0.101 | 0.148 | 0.215 | 0.312 | 0.019 | 0.027 | 0.040 | 0.979 |
| 22.5 | 0.040 | 0.058 | 0.084 | 0.122 | 0.178 | 0.259 | 0.016 | 0.023 | 0.033 | 0.812 |
| 23 | 0.033 | 0.048 | 0.070 | 0.101 | 0.148 | 0.215 | 0.312 | 0.019 | 0.027 | 0.973 |
| 23.5 | 0.027 | 0.040 | 0.058 | 0.084 | 0.122 | 0.178 | 0.259 | 0.016 | 0.023 | 0.807 |
| 24 | 0.023 | 0.033 | 0.048 | 0.070 | 0.101 | 0.148 | 0.215 | 0.312 | 0.019 | 0.968 |

It can be seen that, after the initial eight hours lag, the maximum velocity was of 1.099 Kg/h and the minimum velocity was of 0.803 Kg/h. The mean velocity for the process was 0.9 Kg/h, and the minimum velocity was 73% of the maximum velocity.

Comparison Between Examples 1, 2 and 3:

The total mass of the produce to be freeze dried; the total exposition surface; the change density; the plates' temperature and the applied vacuum were the same in all cases.

After the initial time lag, the following differences were observed:

| | Example 1 | Example 2 | Example 3 |
|---|---|---|---|
| Maximum freeze drying velocity | 2.08 Kg/h | 1.718 Kg/h | 1.099 Kg/h |
| Minimum freeze drying velocity | 0.14 Kg/h | 0.384 Kg/h | 0.803 Kg/h |
| Mean freeze drying velocity | 0.9 Kg/h | 0.9 Kg/h | 0.9 Kg/h |
| Vmax/Vmin | | 6.7 | 4.47 | 1.36 |

Consequently, a smaller capacity vacuum system is required to operate a multichamber equipment as described in examples 2 and 3 than in example 1. The effect increases as more chambers are used: with two chambers the relation is 1.718/2.08=82%, and with nine chambers the relation is 1.099/2.08=52%.

3. Dual Equipment

The present invention brings the means to achieve the high evacuation velocity required to perform Quick Freezing and also to perform Freeze Drying in the same apparatus. Furthermore both processes are performed with a significant costs reduction in comparison with all existing equipment.

The present invention is constituted, as described before, by two or more chambers wherein vacuum can be applied by the action of two or more independent vacuum sub systems, being said vacuum subsystems designed as follows:

a) One to evacuate air from any chamber from atmospheric pressure down to a pressure slightly superior to that of the triple point of water and, b) The other to evacuate water vapor from said pressure slightly superior to that of the triple point of water down to a pressure corresponding to the thermodynamic equilibrium for the solid-vapor system of water, with the desired freezing temperature, in the desired freezing time.

The advantages of the multiple chambers equipment is that it can be used, not only for the Freeze Drying process, as described previously, but also to perform in an independent way a Quick Freezing process, thus constituting a dual equipment, where:

c) The existence of more than one vacuum chamber permits a flash effect during Quick Freezing, because the chamber containing the produce to be frozen is first evacuated to a pressure close to that of the triple point by means of the vacuum subsystem described in a) and then, this chamber is simultaneously connected to the vacuum subsystem described in b) and the other chamber or chambers whose pressure is far below the triple point, thus producing immediate freezing. The flash effect is more significant as more chambers are connected, because the relation between the volume of the chambers that are at low pressure and the volume of the chamber with the produce to be frozen is larger.

d) The existence of more than one vacuum chamber permits to operate sequentially the chambers during Freeze Drying, thus compensating the high initial sublimation velocity in one chamber with the low final sublimation velocity in the other chamber or chambers. Thus, the flow to be extracted from the chambers will have less fluctuation, and the vacuum subsystem will be operated closer to its optimum work capacity. As more chambers are incorporated, the more important the compensation of velocities will be.

EXAMPLE 4

One preferred embodiment of the invention is represented in FIG. 4, with five independent vacuum chambers, two vacuum subsystems and three sets of carts to allocate produces. One set of carts (60) is used to perform Quick Freezing and Freeze Drying, an other set (70) is to perform Bulk Quick Freezing and the remaining set (80) to perform Individual Quick Freezing.

The process to be performed is as follows:

a) The produces are located in different sets of carts 60, 70, 80, depending on the process to be performed, and charged in the first chamber (10).

b) As produces are to be self frozen by means of water evaporation, if it is not desired to loose part of the water contained in them, the necessary amount of water (around 15%) can be added before.

c) Chambers 11, 12, 13 and 14 are evacuated by means of vacuum subsystem 40 down to the specified pressure (which must be over that of the triple point of water, of 4.581 Torr), afterwards, valves 21, 22, 23 and 24 are closed.

d) Valves 31, 32, 33, 34 and 35 are opened and, by means of the vacuum subsystem 50, the chambers 11, 12, 13 and 14 are evacuated down to a pressure of around 0.5 Torr.

e) The chamber 10 is closed, and it is evacuated by means of subsystem 40, down to the specified pressure (valve 20 open, valve 30 closed). As this pressure is superior to that of the triple point of water, the produces herein will be vacuum cooled up to the thermodynamic equilibrium temperature corresponding with this pressure, being said temperature closely superior to 0° C.

f) The valve 20 is dosed and valve 30 is opened, thus producing a very fast drop of pressure in chamber 10 and a slight increase of pressure in the other chambers. As a result of the drop of pressure in chamber 10, a flash effect is produced and the produces therein allocated are quickly frozen. By means of vacuum subsystem 50, the pressure rapidly descends again to the specified pressure of around 0.5 Torr, and to its corresponding temperature of around −25° C.

g) If Quick Freezing was to be performed, chamber 11 is then isolated closing valve 31, its pressure raised up to one atmosphere, and thereafter, the chamber is opened and a new cart with produces is allocated inside.

h) If Freeze Drying was to be performed, instead of g) heat is to be transferred to frozen produce by means of the heating plates, thus causing sublimation of the water contained by the produce.

i) When Freeze drying is finished, chamber 11 is then isolated dosing valve 31, its pressure raised up to one atmosphere, and thereafter, the chamber is opened and a new cart with produces is allocated inside.

j) Operations e) and f) are now performed over chamber 11, by means of valves 21 and 31.

What is claimed is:

1. An apparatus being able to perform consecutively, independently and, or simultaneously the processes of quick freezing and, or freeze drying of produces, and their respective processes, said apparatus characterized by a central vacuum system operating over one or more independent vacuum chambers, and said vacuum system being composed of at least two vacuum subsystems, connected to the chambers by means of independent manifolds, one vacuum subsystem designed to evacuate air from any of the vacuum chambers, from atmospheric pressure to a pressure slightly superior to that of the triple point of water, and the other vacuum subsystems designed to quickly evacuate water vapor from any of the vacuum chambers from said pressure to the pressure corresponding to the thermodynamic equilibrium of ice and water vapor at the desired freezing temperature, in the desired freezing time.

2. An apparatus corresponding to claim 1, characterized by the fact that both vacuum subsystems are directly connected to the chamber.

3. An apparatus corresponding to claim 1, characterized by the fact that one vacuum subsystem is connected to the chamber through the other.

4. An apparatus corresponding to claim 1, characterized by the fact that the vacuum subsystem designed to quickly evacuate water vapor from the chambers from a pressure slightly superior of that corresponding to the triple point of water, down to a pressure corresponding to the thermodynamic equilibrium of ice and water vapor at the desired frying temperature, in the desired freezing time, is constituted by a steam ejector.

5. An apparatus corresponding to claim 1, characterized by the fact that the vacuum subsystem designed to quickly evacuate water vapor from the chambers from a pressure slightly superior of that corresponding to the triple point of water, down to a pressure corresponding to the thermodynamic equilibrium of ice and water vapor at the desired freezing temperature, in the desired freezing time, is constituted by more than one steam ejector.

6. An apparatus corresponding to claim 1, characterized by the fact that the vacuum subsystem designed to evacuate air from the chambers from atmospheric pressure down to a pressure slightly superior of that corresponding to the triple point of water, is constituted by a steam ejector.

7. An apparatus corresponding to claim 1, characterized by the fact that the vacuum subsystem designed to evacuate air from the said chamber from atmospheric pressure to a pressure slightly superior of that corresponding to the triple point of water, is constituted by more than one steam ejector.

8. An apparatus corresponding to claim 1, characterized by the fact that the vacuum subsystem designed to quickly evacuate water vapor from the chambers from a pressure slightly superior of that corresponding to the triple point of water, down to a pressure corresponding to the thermodynamic equilibrium of ice and water vapor at the desired freezing temperature, in the desired freezing time, is constituted by mechanical pumps.

9. An apparatus corresponding to claim 1, characters by the fact that the vacuum subsystem designed to evacuate air from the chambers from atmospheric pressure down to a pressure slightly superior of that corresponding to the triple point of water, is constituted by mechanical pumps.

10. An apparatus corresponding to claim 1, characterized by the fact that the vacuum subsystem designed to quickly evacuate water vapor from the chambers from a pressure slightly superior of that corresponding to the triple point of water, down to a pressure corresponding to the thermodynamic equilibrium of ice and water vapor at the desired freezing temperature, in the desired freezing time, is constituted by a combination of steam ejectors and mechanical pumps.

11. An apparatus corresponding to claim 1, characterized by the fact that the vacuum subsystem designed to evacuate air from the chambers from atmospheric pressure down to a pressure slightly superior of that corresponding to the triple point of water, is constituted by a combination of steam ejectors and mechanical pumps.

12. An apparatus corresponding to claim 1, characterized by the fact that an additional chamber connected between the said vacuum chambers and said subsystem designed to quickly evacuate water vapor, with an intermediary valve between both chambers, thus permitting its evacuation to a very low pressure while the first chamber is being charged with the produces and evacuated to a pressure slightly superior to that of the triple point of water; having said second chamber sufficient volume to assure a fast drop of pressure of the first chamber when the said intermediary valve is opened.

13. An apparatus corresponding to claim 1, characterized by the fact that it has two vacuum chambers independently connected to the central vacuum system, in such a way that any chamber can be in evacuation process while the other can be opened; in stand-by; in charge or discharge stage.

14. An apparatus corresponding to claim 1, characterized by the fact that it has more than two vacuum chambers independently connected to the central vacuum system, in such a way that one or more chambers can be in evacuation process while one or more chambers can be opened; in stand-by; in charge or discharge stage.

15. An apparatus corresponding to claim 1, characterized by the fact that a heating means is inside some vacuum chambers, in order to transfer heat to the frozen produces, and carry out a freeze drying process.

16. A process to be performed with an apparatus as described in claim 1, comprising the following steps:
  a) charging one vacuum chamber with the produces to be frozen white vacuum is made over the other chambers,
  b) then closing the chamber charged with produces and evacuating the air down to a pressure not less than 4.581 Torr,
  c) then opening the connection valve between the chamber charged with produces and the others when the pressure in the other chambers is less of 4.581 Torr, thus making the pressure in said chamber charged with produces to drop very quickly by means of:
  i) the subsystem designed mainly to quickly evacuate water vapor and
  ii) the connection to the other chambers being at a pressure less than 4.581 Torr, reaching in few seconds a pressure below of that of the triple point of water, and therefore, the produces located at the chamber will freeze in the few seconds,
  d) then isolating one of the other chambers from the vacuum system by means of its corresponding values, releasing the vacuum,
  e) then, when the chamber reaches atmospheric pressure, opening the chamber and charging another set of produces in this chamber,
  f) closing it, evacuating the air and beginning a now cycle, and
  g) performing the same cycle with the other chambers, then isolating the first chamber charged with produce, releasing its vacuum, opening the chamber, retiring the frozen produces, and beginning a new sequence.

17. A process of claim 16, further comprising transferring heat to the frozen produce and thus giving way to the sublimation of the water contained in the produce before releasing the vacuum in each chamber.

18. A process of claim 16, further comprising carrying out a freeze flying process in the chambers and quick freezing in the others.

19. A process of claim 16, further comprising adding water to the produces before locating them in the chambers.

20. A process of claim 16, further comprising locating the produces pre-packaged in the chambers, with the condition that the packaging being permeable to water vapor.

21. A process as described in claim 20, where the packaging is constructed with a thermal insulating material, with a means in the packaging to permit vapor elimination.

22. An apparatus as described in claim 1, where said apparatus can be transported inside a container, ready to operate after rapid connections are made to energy sources.

23. An apparatus as described in claim 1, where said apparatus can be transported inside more than one container, ready to operate after rapid connections are made to energy sources and seen the different components in each container.

24. An apparatus as described in claim 1, where the vacuum subsystems are designed to operate down to and from the triple point of other liquids different than water.

25. A process as described in clam 18, where the fluid to be sublimated is other than water.

26. An apparatus being able to perform consecutively, independently and, or simultaneously the processes of quick freezing and, or freeze drying of produces, and their respective processes, said apparatus characterized by a central vacuum system operating over one or more independent vacuum chambers, and said vacuum system being composed of at least two vacuum subsystems, connected to the chambers by means of independent manifolds, one vacuum subsystem employing steam ejectors and/or a mechanical pump designed to evacuate air from any of the vacuum chambers, from atmospheric pressure to a pressure slightly superior to that of the triple point of water, and the other vacuum subsystems employing steam ejectors and/or a mechanical pump designed to quickly evacuate water vapor from any of the vacuum chambers from said pressure to the pressure corresponding to the thermodynamic equilibrium of ice and water vapor at the desired freezing temperature, in the desired freezing time.

* * * * *